H. HOWE.
Wheel-Cultivator.
No. 48,068.   Patented June 6, 1865.
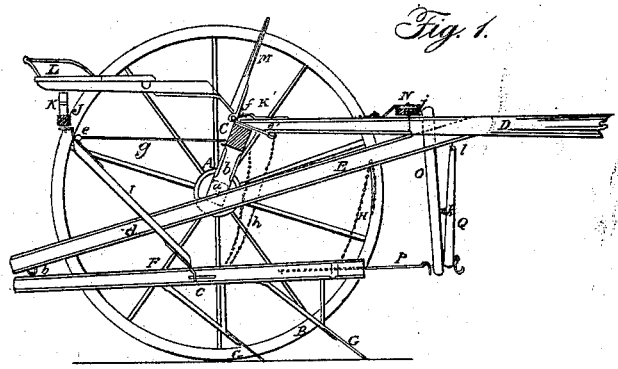
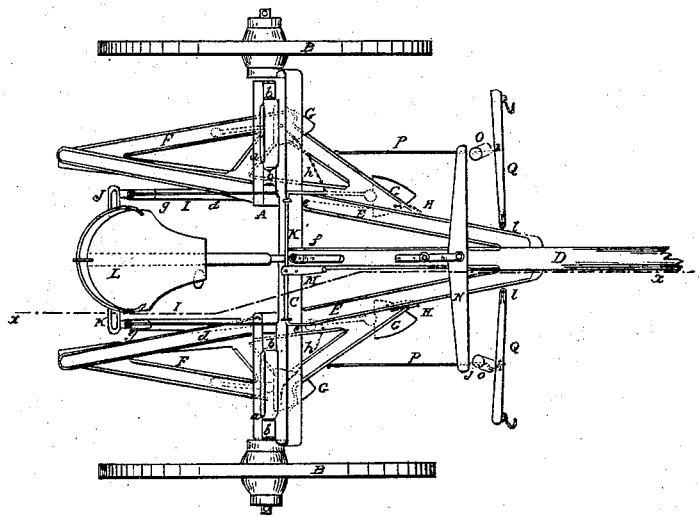
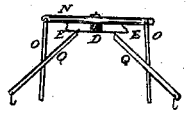
Witnesses:   Inventor:

UNITED STATES PATENT OFFICE.

HENRY HOWE, OF DARLINGTON, WISCONSIN.

IMPROVEMENT IN CULTIVATORS.

Specification forming part of Letters Patent No. 48,068, dated June 6, 1865.

*To all whom it may concern:*

Be it known that I, HENRY HOWE, of Darlington, in the county of La Fayette and State of Wisconsin, have invented a new and Improved Cultivator; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\, x$, Fig. 2; Fig. 2, a plan or top view of the same; Fig. 3, a diminished front view of the draft-equalizer pertaining to the same.

Similar letters of reference indicate corresponding parts.

This invention relates to a new and improved cultivator designed for plowing corn and other crops which are grown in hills or drills; and it consists in a novel arrangement of parts, as hereinafter fully shown and described, whereby the plows are placed under the complete control of the operator and rendered capable of being moved laterally to conform to the sinuosities of the rows of plants, and also of being readily raised and lowered.

A represents the axle of the machine, having a wheel, B, at each end. This axle is composed of two short parts, $a\, a$, having uprights $b$ attached to them, the upper ends of the latter having a bar, C, secured to them, as shown in Fig. 2.

D represents the draft-pole, the rear end of which is secured to the center of the bar C; and E E are two oblique bars, the front ends of which are attached to the draft-pole D, and are secured about at their centers to the inner ends of the parts $a\, a$ of the axle.

The parts above described constitute the framing of the machine.

F F represent two triangular plow-frames, each of which has two plows, G G, attached to it. The rear ends of these frames are connected by joints $b$ to the rear ends of the bars E E, and the front ends of the frames are connected by chains H to the bars E. The inner sides of the frames F are connected by joints $c$ to the lower ends of bars I I, and said bars I are connected by joints $d$ to the oblique bars E E. The upper ends of the bars I I are connected by joints $e$ to the ends of a cross-piece, J, which has an elliptic spring, K, upon it, with the driver's seat L, of saddle shape, secured thereon. This seat is secured at its front end to the rear of the draft-pole D by a pivot-bolt, $f$. The upper ends of the bars I I are braced by rods $g$ from the bar C, and the plow-frames F are connected at about the center of their outer edges by chains $h$ with arms $e'$ at the ends of a shaft, K′, on bar C, said shaft having a handle or lever, M, attached to it, which is within reach of the driver on seat L. By this arrangement it will be seen that as the machine is drawn along a lateral motion may be given the frames F F by the driver moving or shifting the seat L, which is readily done, as the feet of the driver rest on the parts $a\, a$ of the axle; and it will also be seen that the plows may be raised by drawing back the lever M, the plows being retained in an elevated position by placing the handle under a plate, $i$, attached to the right side of seat L.

N is a double-tree attached to the draft pole D, and having a pendent bar, O, connected to each end of it by a joint, $j'$. The lower ends of these bars O are connected by rods P with the plow-frames F F, and each bar O has a draft-bar, Q, connected to it by a joint, $k$, the inner ends of the draft-bars being attached by joints $l$ to the front ends of the oblique bars E E. This double-tree, with the parts attached to it, as described, forms a draft-equalizer which operates in the most efficient manner.

Having thus described my invention, I claim as new and desire to secure by Letters Patent—

1. The oblique bars E E, connected to the draft-pole D and to the short parts $a\, a$ of the axle A, in connection with the bars I I and driver's seat L, substantially as and for the purpose set forth.

2. The plow-frames F F, connected to the bars E E I I and shaft K′, substantially as shown, and to admit of being operated as described.

HENRY HOWE.

Witnesses:
A. D. BLAKELEY,
G. L. CHAPMAN.